(12) United States Patent
Gao et al.

(10) Patent No.: US 7,020,246 B2
(45) Date of Patent: Mar. 28, 2006

(54) TIME DOMAIN REFLECTED SIGNAL MEASUREMENT USING STATISTICAL SIGNAL PROCESSING

(75) Inventors: Xiao M. Gao, Raleigh, NC (US);
Wesley H. Smith, Raleigh, NC (US);
Veda Krishnan, Raleigh, NC (US);
Kanna Krishnan, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 10/609,838

(22) Filed: Jun. 30, 2003

(65) Prior Publication Data

US 2004/0264684 A1 Dec. 30, 2004

(51) Int. Cl.
*H04M 9/08* (2006.01)
*H04M 1/24* (2006.01)

(52) U.S. Cl. .............................. 379/1.01; 379/406.09; 379/406.11; 379/1.01; 379/27.01; 379/27.03; 379/27.08

(58) Field of Classification Search .............................. 379/406.01–406.16, 1.04
See application file for complete search history.

(56) References Cited

U.S. PATENT DOCUMENTS

| | | | | |
|---|---|---|---|---|
| 5,473,686 A | * | 12/1995 | Virdee ................... | 379/406.08 |
| 6,091,713 A | | 7/2000 | Lechleider et al. ......... | 370/248 |
| 6,167,133 A | * | 12/2000 | Caceres et al. ......... | 379/406.13 |
| 6,377,901 B1 | * | 4/2002 | List et al. .................... | 702/119 |
| 6,421,443 B1 | * | 7/2002 | Moore et al. .......... | 379/406.01 |
| 6,510,225 B1 | * | 1/2003 | Robertson et al. ....... | 379/406.1 |
| 6,654,463 B1 | * | 11/2003 | Leonidov et al. ....... | 379/406.08 |
| 2002/0131583 A1 | * | 9/2002 | Lu ......................... | 379/406.08 |
| 2002/0191779 A1 | * | 12/2002 | Pham .................... | 379/406.08 |

OTHER PUBLICATIONS

Rentko, Bobbi. "Telcordia DSL Loop Qualification Service (DLQS) for ISP Market—Qualifying end-sers transparently for DSL service—White Paper". pp. 1-5. Copyright 2002, Telcordia Technologies, Inc. no date.
Telcordia™ DSL Loop Qualification Service (formerly Sapphyre). Printed from www.telcordia.com, Feb. 3, 2003.

* cited by examiner

*Primary Examiner*—Sinh Tran
*Assistant Examiner*—Ramnandan Singh
(74) *Attorney, Agent, or Firm*—Trop, Pruner & Hu, P.C.

(57) ABSTRACT

An apparatus and technique for determining whether a telephone loop is capable of carrying a Digital Subscriber Line (DSL) signal. Time domain reflected (TDR) signals that are echoes of transmit impulse signals are processed using time domain echo averaging and echo enhancement using second-order statistics. Each technique allows clearer visualization of the TDR echo signal by reducing the noise and distortion present in the TDR signals. These statistical signal processing techniques allow determination of telephone loop characteristics such as loop length once the TDR echo signal amplitude and time index are calculated.

27 Claims, 9 Drawing Sheets

TIME DOMAIN REFLECTED SIGNAL MEASUREMENT USING STATISTICAL SIGNAL PROCESSING

CROSS-REFERENCE TO RELATED APPLICATIONS

This application relates to the following commonly assigned co-pending applications entitled: "Estimation Of DSL Telephone Loop Capability Using CAZAC Sequence," Ser. No. 10/609,806, filed Jun. 30, 2003, "Fuzzy Logic Impedance Mismatch Network For DSL Qualification," Ser. No. 10/609,989, filed Jun. 30, 2003, all of which are incorporated by reference herein.

BACKGROUND

This disclosure relates generally to determining if a Digital Subscriber Line (DSL) telephone loop is capable of carrying DSL signals, and more particularly for generating improved time domain reflected (TDR) signals for determining DSL telephone loop capability.

Deployment of broadband services on a telephone loop is severely limited by the inherent properties of the copper cable and, in part, because initial deployment of the copper cable was aimed primarily at providing voice services to subscribers. Until the telephone loop electronics and plant are upgraded or replaced, as by installation of optical fiber loops, advanced digital signal processing holds great promise today for subscribers who desire broadband services such as high speed internet access, remote Local Area Network (LAN) access and switched digital video today. Technological advances have brought about Digital Subscriber Line (DSL) technology at high data rates, e.g., High-rate DSL (HDSL), Asymmetric DSL (ADSL) and Very high-speed DSL (VDSL). For example, using ADSL technology, broadband signals are modulated by ADSL modems into copper telephone loops at passband frequencies so that Plain Old Telephone Service (POTS) or another baseband service may be carried on the same pair of copper wires. Using the existing copper telephone loop is extremely cost effective as the installation of new cable and structure along with their associated labor and material costs are avoided.

Deployment of technologies such as xDSL (HDSL, ADSL, VDSL, . . . ), however may be limited by the transmission characteristics of the telephone loop. As such, before a particular subscriber may utilize DSL technology for his or her broadband services, the broadband service provider has to determine or have determined the viability of deploying DSL to that subscriber. Thus, there is a need for a system and technique that is able to determine at a subscriber's premises without any intervention or cooperation from the telephone company or Internet Service Provider (ISP) whether the telephone loop is capable of carrying a DSL signal.

DETAILED DESCRIPTION

Deployment of DSL technology is limited by the transmission characteristics of the telephone loop. The transmission characteristics of the telephone loop depend on the length of the copper line, its gauge, the presence of bridged taps, the quality of splitters, the integrity of the shielding, loading coils, impedance mismatches and other loop impairments. Specifically, line loss increases with line length and attenuation increases with increasing frequency and decreases as wire diameter increases. There are particular points along the telephone loop between the subscriber's termination and the originating central office (CO) where the loop is particularly susceptible to ingress noise. These points include, for example, the location of a bridged tap, the drop wire from the telephone pole to the home, and the wires within the home. At the aforementioned points ingress noise may be coupled into the loop. The presence of other telephone terminals connected to other pairs in the cable also introduces noise into the DSL signal. Furthermore, bridged taps create more loss, distortion, and echo. All these factors serve to limit the data transfer rate at which a subscriber may be connected to a broadband service provider over the telephone loop and are a major cause of connection problems subscribers currently face in making data connections via the public switched telephone network.

Service providers have several options to determine the environment the DSL signal operates in before they commit to service when a subscriber requests DSL service. The service provider may query the outside plant records to determine the loop configuration. Outside plant records more than likely would have been constructed from the original design records. In many cases, the records available are outdated and do not reflect changes that may have occurred in the outside plant as a result of maintenance and service orders. The end result is that the records are usually inaccurate and may not be relied upon to provide information required by the carrier to predict a telephone loop's ability to support DSL service. The approach described above does not provide the telephone loop characteristic information with a degree of accuracy required to confidently predict DSL performance over the loop.

Figure 1:
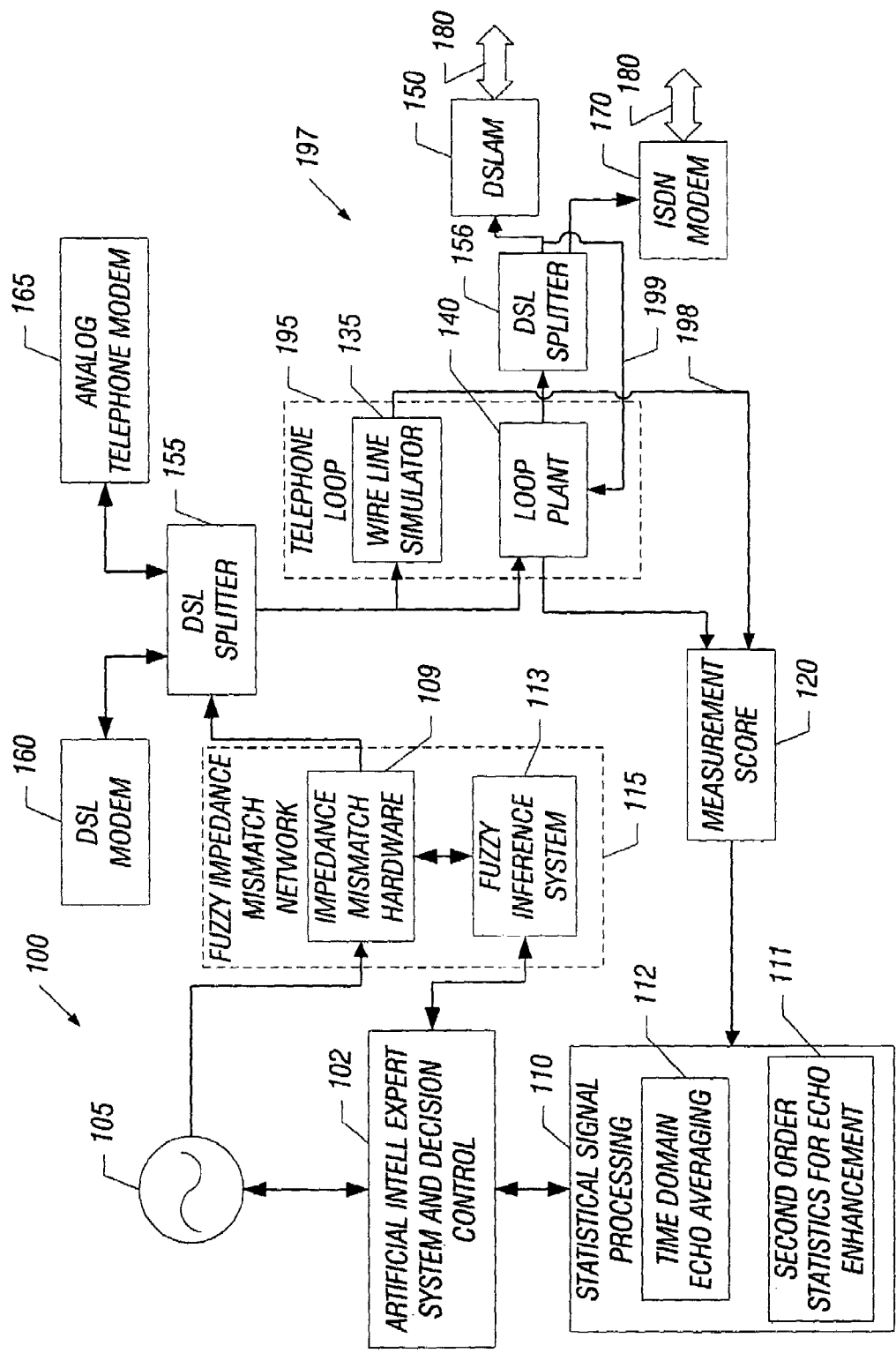
FIG. 1 is a block diagram of a DSL loop qualification system including statistical signal processing for improved TDR echo signal in accordance with an embodiment of the invention.

One way to accurately calculate loop characteristic information is to use the DSL loop qualification system 100 shown in FIG. 1. DSL loop qualification system 100 determines whether the loop plant 140 is capable of carrying a DSL signal. The DSL loop qualification system 100 includes statistical signal processing 110 for determining the amplitude and time index of the received TDR signals that are echoes of transmit impulse signals. Once the amplitude and time index of the TDR echo signal is known, other loop characteristics such as telephone loop length may be determined. In FIG. 1, a signal generator 105 may generate impulse signals for transmission to the loop plant 140 and CO 197. The returned signals received by DSL qualification system 100 include echoes of the impulse signals and noise and distortion generated from the various sources described above. In order to increase the echoes to allow detection over the noise and distortion, statistical signal processing may be used as described in greater detail below.

Figure 2:
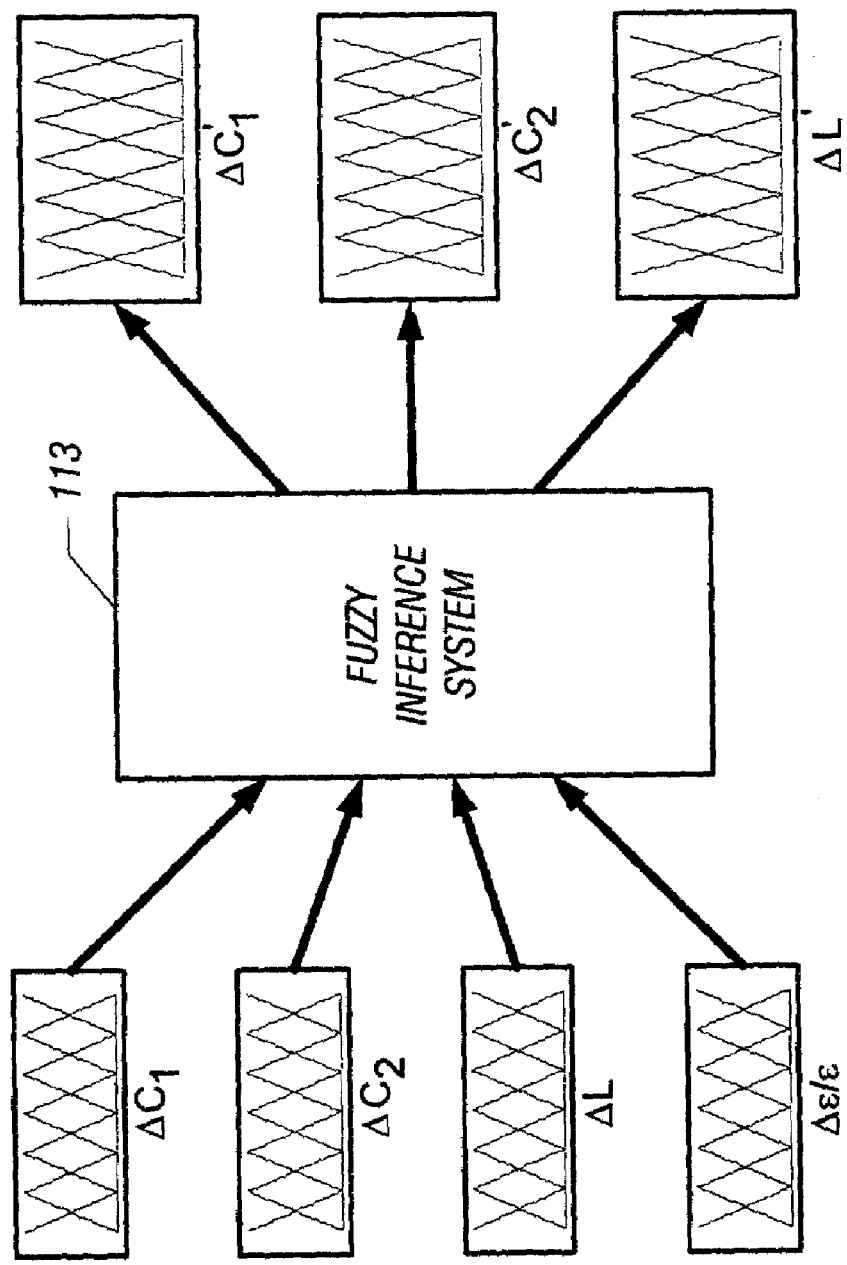
FIG. 2 shows the fuzzy inference system of FIG. 1 with its inputs and outputs.

Referring to FIGS. 1 and 2, DSL loop qualification system 100 includes a fuzzy impedance mismatch network 115 that receives output from signal generator 105. Fuzzy impedance mismatch network 115 may include impedance mismatch hardware 109 and a fuzzy inference system controller 113 in one embodiment. Impedance mismatch hardware 109 includes two adjustable capacitors $C_1$ and $C_2$, and one adjustable inductor L. Fuzzy inference system controller 113 adjusts the values of the impedance mismatch hardware to increase or, in some embodiments, to maximize the TDR echo signals. The fuzzy inference system 113 is controlled by artificial intelligence-based expert system and decision (AIESD) controller 102. AIESD controller 102 also controls the signal generator 105 and the statistical signal processing controller 110. In one embodiment, AIESD controller 102 receives the generated impulse signals from signal generator 105 and TDR echo signals from statistical signal processing controller 110. The AIESD controller 102 then calculates the change in TDR echo value versus the TDR echo value ($\Delta\epsilon/\epsilon$) that is output to the fuzzy inference system 113. The TDR echo value $\epsilon$ is the magnitude of the TDR echo signal that may be calculated in volts or decibels by the measurement scope in some embodiments. The change in TDR echo value $\Delta\epsilon$ is the difference between the TDR echo value from an impulse signal with one set of values for $C_1$, $C_2$, and L and the echo value from the impulse signal transmit in the next iteration with another set of values for $C_1$, $C_2$, and L. As shown in FIG. 2, fuzzy inference system 113 receives as inputs ($\Delta\epsilon/\epsilon$) from AIESD controller 102. The fuzzy inference system 113 outputs to the impedance mismatch hardware 109 a new change in capacitance $C'_1(\Delta C'_1)$, new change in capacitance $C'_2$ ($\Delta C'_2$), and new change in inductance L' ($\Delta L'$) as shown in FIG. 2 using fuzzy membership functions. Fuzzy membership functions are derived by incorporating all the known input-output behaviors, uncertainties and qualitative design objectives of the DSL qualification system. The fuzzy inference system 113 also receives as inputs $\Delta C_1$, $\Delta C_2$, and $\Delta L$ that are the previous iteration outputs of $\Delta C'_1$, $\Delta C'_2$, and $\Delta L'$, respectively, of fuzzy inference system 113. Thus, the output values $\Delta C'_1$, $\Delta C'_2$, and $\Delta L'$ become the input values $\Delta C_1$, $\Delta C_2$, and $\Delta L$, respectively, for the fuzzy inference system 113 in the next iteration of maximization of the TDR echo signal. Capacitors C1, C2 and inductor L in impedance mismatch hardware 109 are adjusted based on the values of $\Delta C'_1$, $\Delta C'_2$, and $\Delta L'$.

Operation of the fuzzy inference system 113, in one embodiment, may include: (a) translation of a crisp input value into a fuzzy output value known as fuzzification using fuzzy membership functions, (b) rule evaluation, where the fuzzy output values are computed, and (c) translation of a fuzzy output to a crisp value known as defuzzification. The fuzzy inference system 113 includes a range of values for its input and output variables shown in FIG. 2. Thus, for example, $\Delta C_1$ varies over the range $-20$ μF to 20 μF and $\Delta L$ varies over the range $-10$ μH to 10 μH. Labels for the triangular shaped fuzzy membership functions for each of the input and output values of the fuzzy inference system are:

| | |
|---|---|
| NL | negative large |
| NM | negative medium |
| NS | negative small |
| NSC | no significant change |
| PS | positive small |
| PM | positive medium |
| PL | positive large |

Fuzzy membership functions are derived by incorporating all the known input-output behaviors, uncertainties and qualitative design objectives of the DSL qualification system. The fuzzy inference system 113 for each of the input and output variables uses a set of rules, in one embodiment, to maximize the echo value:

| | |
|---|---|
| IF $\Delta C_1$ is NL and ($\Delta\epsilon/\epsilon$) is NL then $\Delta C'_1$ is NM | Rule 1 |
| IF $\Delta C_1$ is NM and ($\Delta\epsilon/\epsilon$) is NL then $\Delta C'_1$ is NS | Rule 2 |
| IF $\Delta C_1$ is NL and ($\Delta\epsilon/\epsilon$) is NM then $\Delta C'_1$ is NS | Rule A + 1 |
| IF $\Delta C_1$ is NL and ($\Delta\epsilon/\epsilon$) is NS then $\Delta C'_1$ is NSC | Rule A + 2 |
| IF $\Delta C_1$ is NM and ($\Delta\epsilon/\epsilon$) is NM then $\Delta C'_1$ is NS | Rule B + 1 |
| IF $\Delta C_1$ is NM and ($\Delta\epsilon/\epsilon$) is NS then $\Delta C'_1$ is NSC | Rule B + 2 |
| IF $\Delta C_2$ is NL and ($\Delta\epsilon/\epsilon$) is NL then $\Delta C'_2$ is NM | |
| IF $\Delta C_2$ is NM and ($\Delta\epsilon/\epsilon$) is NL then $\Delta C'_2$ is NS | |
| IF $\Delta C_2$ is NL and ($\Delta\epsilon/\epsilon$) is NM then $\Delta C'_2$ is NS | |
| IF $\Delta C_2$ is NL and ($\Delta\epsilon/\epsilon$) is NS then $\Delta C'_2$ is NSC | |
| IF $\Delta L$ is NL and ($\Delta\epsilon/\epsilon$) is NL then $\Delta L'$ is NM | |
| IF $\Delta L$ is NM and ($\Delta\epsilon/\epsilon$) is NL then $\Delta L'$ is NS | |
| IF $\Delta L$ is NL and ($\Delta\epsilon/\epsilon$) is NM then $\Delta L'$ is NS | |
| IF $\Delta L$ is NL and ($\Delta\epsilon/\epsilon$) is NS then $\Delta L'$ is NSC | |

The rules given above are derived by incorporating all the known input-output behaviors, uncertainties and qualitative design objectives of the DSL qualification system. Each label is given to each fuzzy input $\Delta C_1$, $\Delta C_2$, $\Delta L$, and ($\Delta\epsilon/\epsilon$) in a rule and the appropriate fuzzy output generated. The fuzzy inputs $\Delta C_1$, $\Delta C_2$, $\Delta L$, and ($\Delta\epsilon/\epsilon$) go through the fuzzy inference system and defuzzification technique to generate new crisp outputs $\Delta C'_1$, $\Delta C'_2$, and $\Delta L'$ to adjust the impedance of the mismatch network.

Referring again to FIG. 1, DSL loop qualification system 100 may contain a measurement scope 120 to receive TDR echo signals over the return paths from either wire line simulator 135 or loop plant 140. The measurement scope 120 may be a microprocessor based instrument such as an oscilloscope including an analog-to-digital (A/D) converter and application software to detect, capture and preprocess the received TDR echo signal. In another embodiment, measurement scope 120 may be included in DSL modem 160 that is capable of determining whether the telephone loop may carry a DSL signal. The measurement scope outputs the TDR echo signal to statistical signal processing controller 110. Statistical signal processing controller 110 processes the TDR echo signals using time domain echo averaging 112 and second order statistics for echo enhancement 111 to reduce or, in some cases, eliminate noise and permit visualization of the TDR echo signal and original impulse signal. DSL splitter 155 that may be an analog filter or digital filter separates the data signals from the voice signals transmit over the copper lines of the telephone loop 195. Data splitter 155 may separate the data signals from the voice signals by separating the frequencies of the data signals from the frequencies of the voice signals.

In one embodiment of the invention shown in FIG. 1, telephone loop 195 includes a wireline simulator 135 and loop plant 140. Wireline simulator 135 provides loop plant 140 profile data and may be used to assist in line identification. Thus, wireline simulator 135 provides a reference model for the loop plant 140. In some embodiments, wireline simulator 135 may be disconnected once the loop plant profile data has been obtained and measurement scope 120 is connected to loop plant 140. In some embodiments, telephone loop plant 140 is the path over which the DSL signal travels to the CO 197 and returns from the CO through return path 199 to measurement scope 120. The DSL signal is affected by various characteristics of the loop plant including copper cable length, gauge, presence of bridged taps, quality of splices, integrity of shielding, loading coils, impedance mismatches and interference. After traveling through loop plant 140, the DSL signal is transmitted to DSL splitter 156 in CO 197 that separates DSL data signals and voice signals that may have overlapped during transmission through loop plant 140. The DSL signal may then be transmitted to a DSLAM 150 or ISDN modem 170 for high speed transmission 180 to the ISP network. If the DSL loop qualification system 100 has determined that the telephone loop is capable of carrying the DSL signal, DSL modem 160 and analog telephone modem 165, as shown in FIG. 1, in some embodiments may verify the results of the DSL loop qualification system. Verification may occur by simultaneously sending and receiving an actual DSL signal as well as an analog modem signal over the telephone loop 195.

Figure 3:
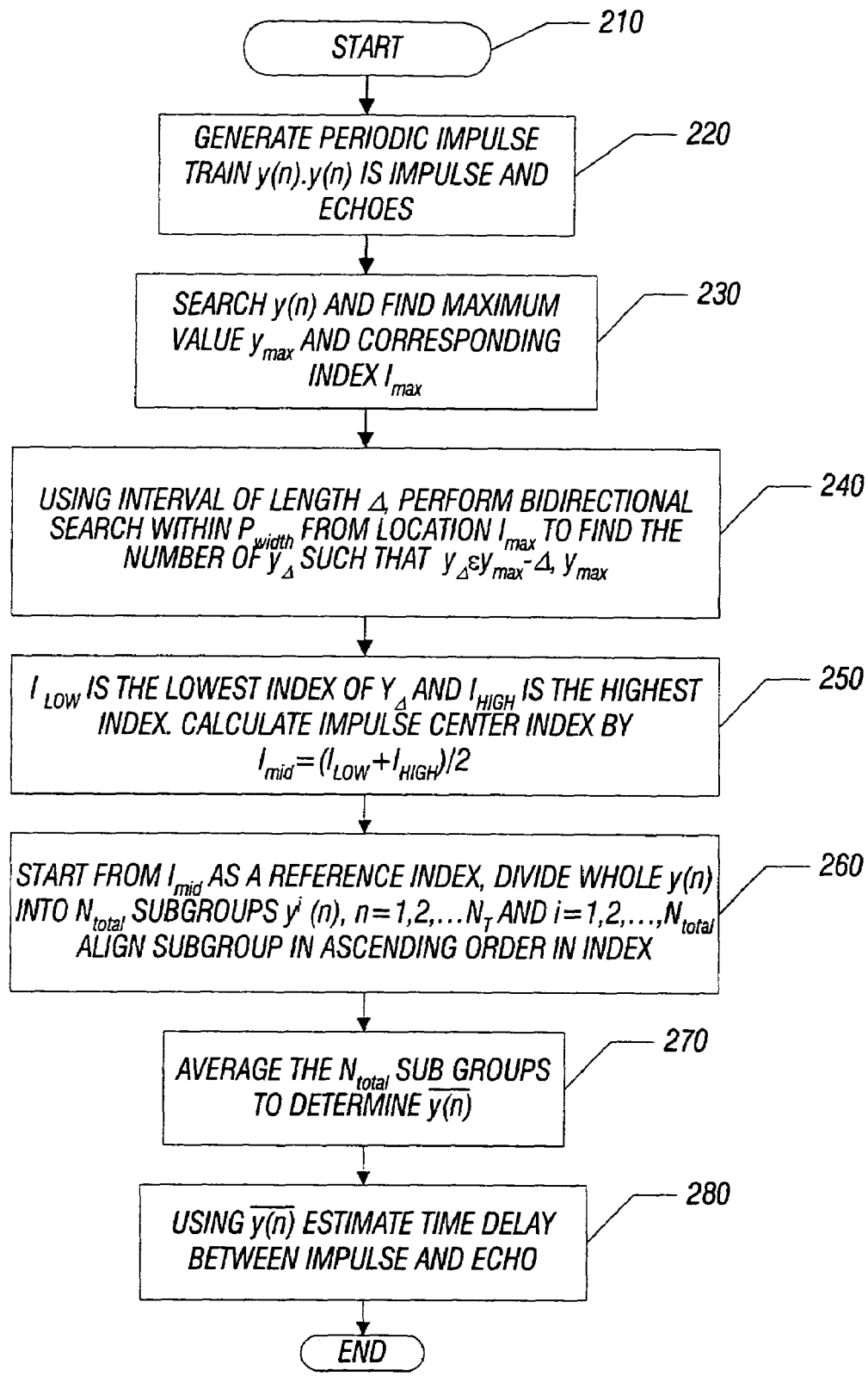
FIG. 3 is a flow chart showing time domain echo averaging technique in accordance with an embodiment of the invention.

Referring to FIG. 3, time domain echo averaging technique 112 in statistical signal processing controller 110 separates the TDR echo signal and accompanying periodic impulse signal into several groups for estimation of the time delay between the impulse and TDR echo signals. As shown in FIG. 3, in one embodiment, the time domain echo averaging technique 112 proceeds as follows:

1. In block 220, generate a periodic impulse train y(n) with each period T having $N_T$ samples. The impulse width is $P_{width}$. The continuous periodic impulse train function y(t) is sampled to generate the sampled periodic impulse train y(n).
2. In block 230, search y(n) and find the maximum value $y_{max}$ and its corresponding index $I_{max}$.
3. In block 240, using the interval Δ (defined as an interval along the vertical axis y) that is provided by AIESD, do a bi-directional search within $P_{width}$ from location $I_{max}$ to find the number of $y_\Delta$ that $y_\Delta \epsilon [y_{max}-\Delta, y_{max}]$. Block 250, let $I_{low}$ be the lowest index of $y_\Delta$ and $I_{high}$ the highest index. Find the impulse center index by using $$I_{mid} = \left[\frac{I_{low} + I_{high}}{2}\right].$$

4. In block 260, starting from $I_{mid}$ as a reference index, divide the whole y(n) into $N_{total}$ subgroups $y^{(i)}(n)$, n=1, 2, ..., $N_T$ and i=1, 2, ..., $N_{total}$. Align the subgroup in ascending order in index.
5. In block 270, average the $N_{total}$ subgroups using $$\overline{y(n)} = \frac{\sum_{i=1}^{N_{total}} y^{(i)}(n)}{N_{total}}, \quad n = 1, 2, \cdots N_T.$$

In block 280, use $\overline{y(n)}$ to estimate the time interval between the impulse and its echo. The time interval between the impulse and its echo can be determined by plotting on a graph of amplitude versus sample number the averaged values of the samples $\overline{y(n)}$. This graph clearly shows the time interval between the averaged echo peak and the impulse (described below for an example shown in FIG. 8) and permits calculation of the time interval.

The time domain echo averaging technique in one embodiment may be implemented as software executing on statistical signal processing controller 110. In another embodiment, the time domain echo averaging technique may be implemented for higher performance using digital and analog circuits.

Figure 4:
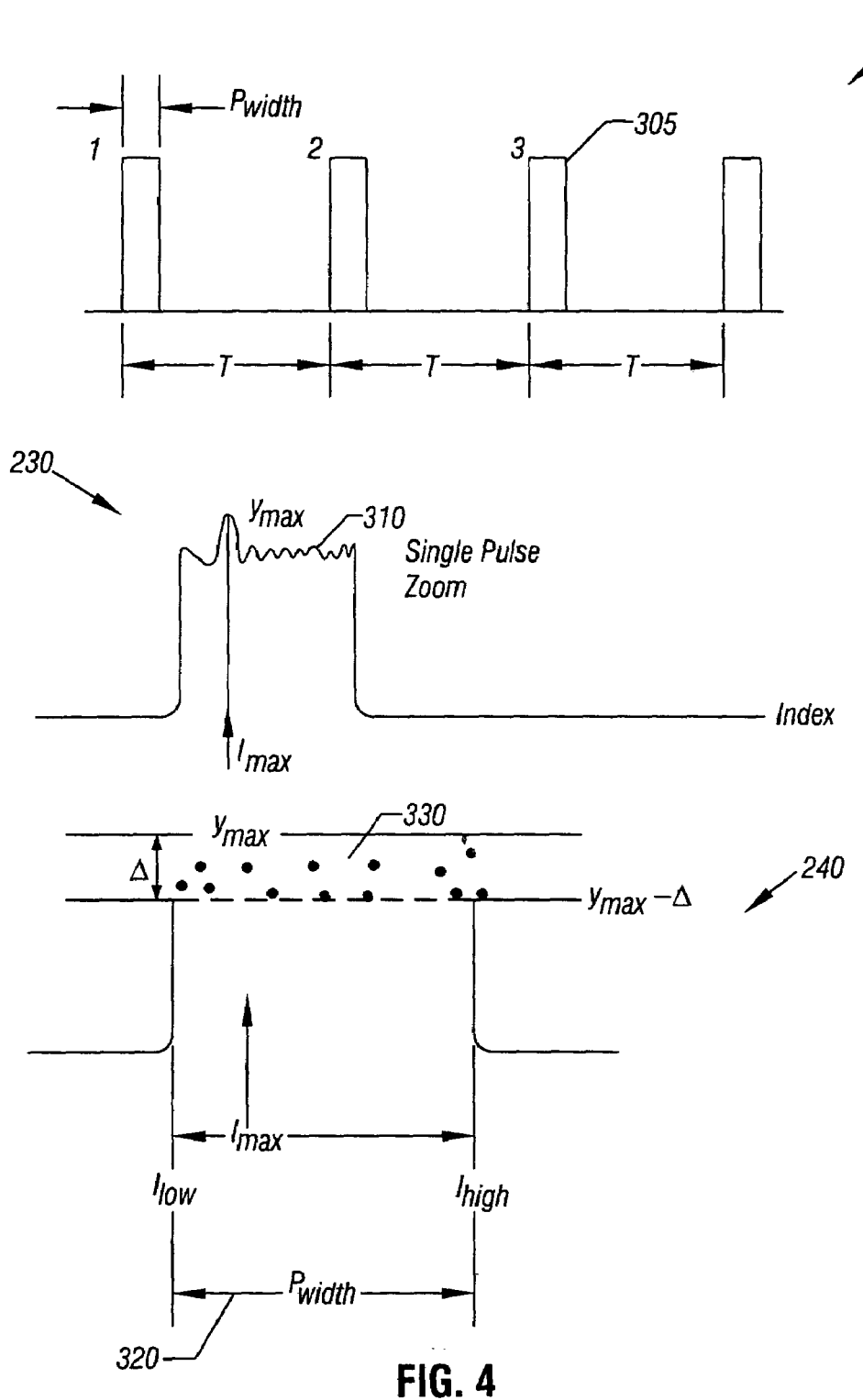
FIG. 4 shows exemplary use of time domain echo averaging technique on data in accordance with an embodiment of the invention.
Figure 5:
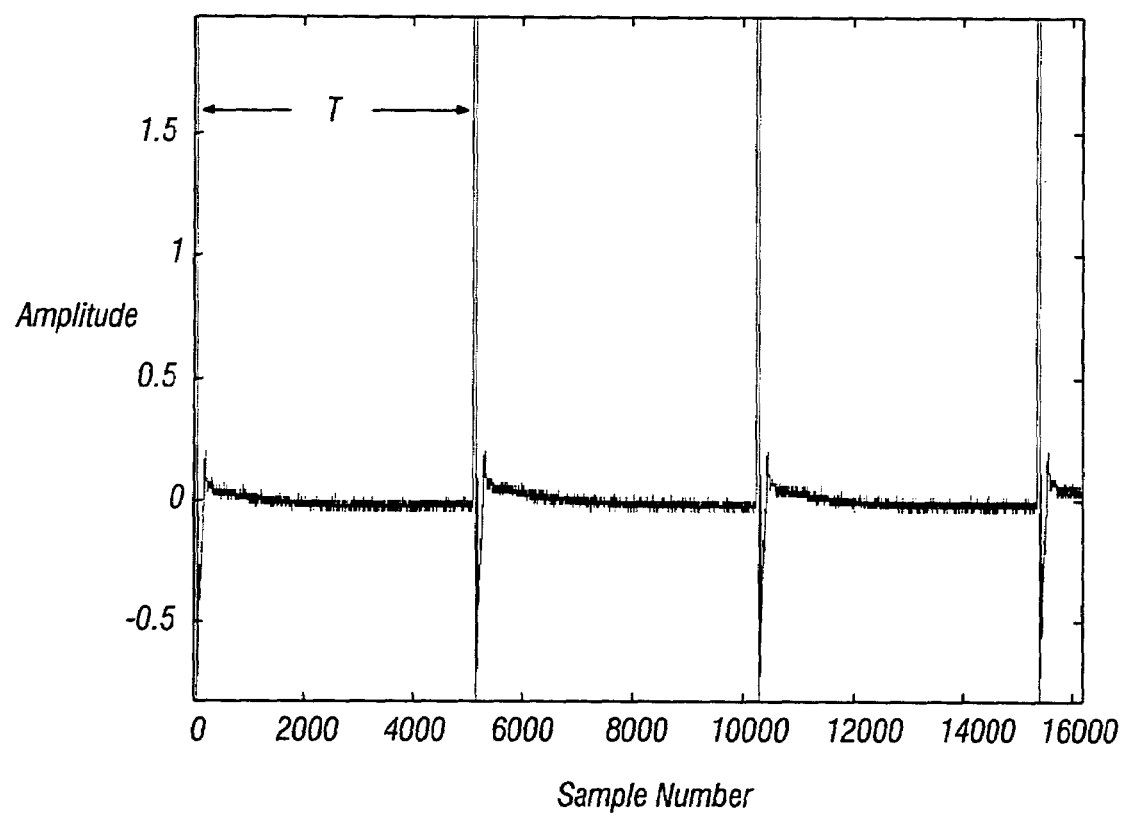
FIG. 5 shows a periodic impulse train and measured TDR echo signals of the impulse train with noise removed using simulated data for a telephone loop in accordance with an embodiment of the invention.
Figure 6:
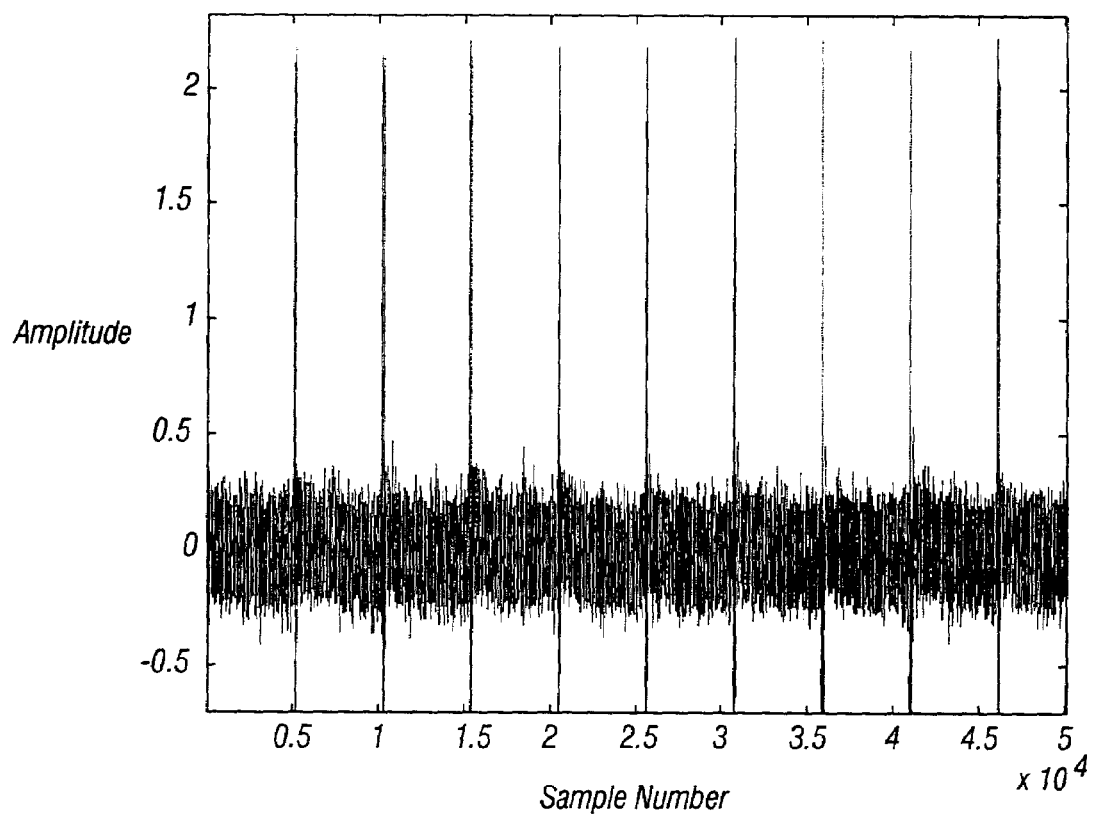
FIG. 6 shows a periodic impulse train and measured TDR echo signals of the impulse train with noise using simulated data for a telephone loop in accordance with an embodiment of the invention.
Figure 7:
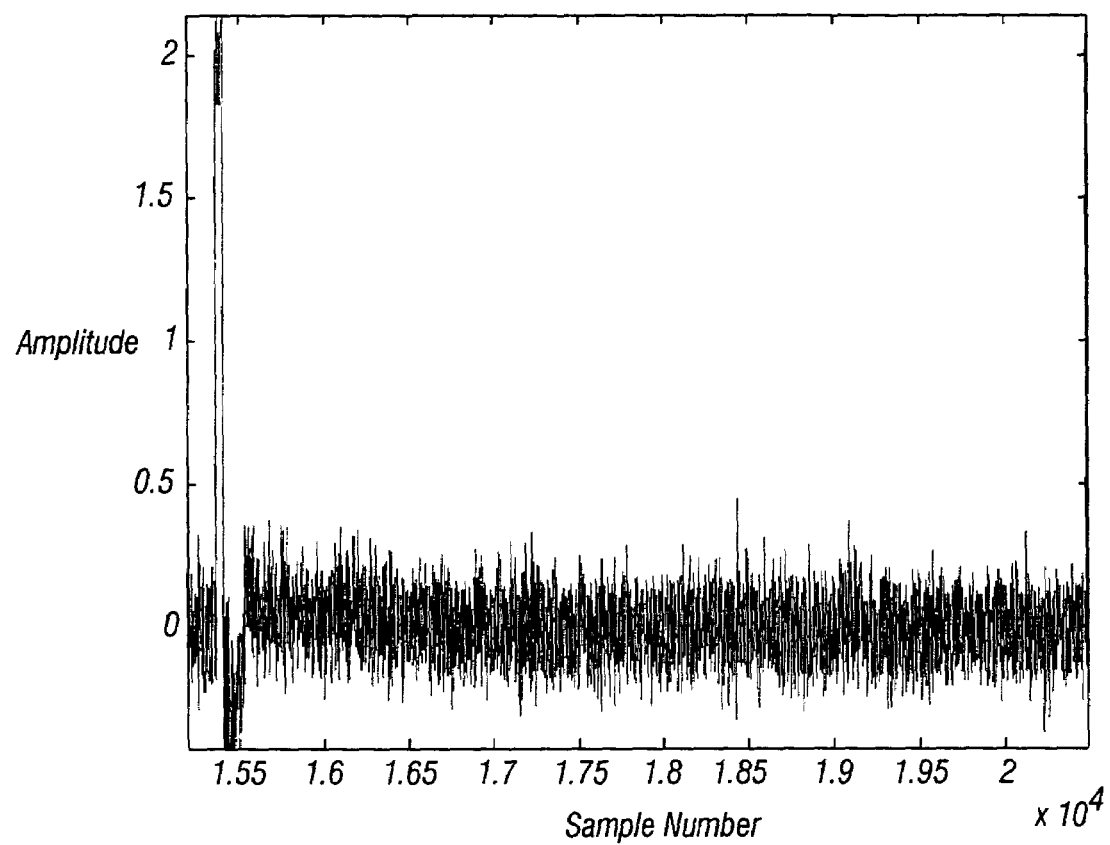
FIG. 7 shows one impulse and its measured TDR echo signals with noise using simulated data for a telephone loop in accordance with an embodiment of the invention.

An example of the use of time domain echo averaging technique 112 as shown in FIG. 3 and described above is discussed with reference to FIGS. 4–8. In FIG. 4, a periodic impulse train 305 y(n) with period T and impulse width $P_{width}$ is received from the telephone loop 195. Impulse train 305 may be divided into three complete segments each of period T as shown in FIG. 4. Each segment is sampled $N_T$ times. Impulse train 305 includes the original impulse signal generated by signal generator 105 and TDR echo signals with noise shown more clearly in the single impulse zoom 230. The original impulse signal may have an amplitude of 2.0 volts and period T=5200 samples. FIG. 5 shows an impulse train and measured TDR echo signals of the impulse train using simulated data for a telephone loop with noise removed. In FIG. 5, the y-axis corresponds to the amplitude of the impulse train and the x-axis corresponds to the sample number or time (i.e. time=sample number×sampling rate). In some embodiments, a maximum value $y_{max}$ is determined by searching y(n) within the interval $P_{width}$ as shown for the single impulse zoom 230. The corresponding index $I_{max}$ of maximum value $y_{max}$ is also determined. As evident from the single impulse zoom shown in FIG. 4, noise 310 makes the TDR echo signal almost invisible and difficult to detect. FIG. 6 shows the impulse train and TDR echo signals of the impulse train with noise using simulated data. In FIG. 6, the y-axis corresponds to the amplitude of the impulse train and the x-axis corresponds to the sample number or time (i.e. time=sample number×sampling rate). FIG. 7 shows one impulse and TDR echo signals of the impulse with noise using simulated data. In FIG. 7, the y-axis corresponds to the amplitude of the impulse and the x-axis corresponds to the sample number or time (i.e. time=sample number×sampling rate). As seen from FIG. 6 and FIG. 7, the echo is invisible and difficult to detect.

Returning to FIG. 4, an interval Δ is calculated by AIESD controller 102. To determine Δ, AIESD controller 102 calculates the variance $\sigma^2$ of the TDR echo signal samples with noise 310. The variance $\sigma^2$ of the TDR echo samples with noise 310 is a measure of how severe the noise is. In one embodiment, the variance $\sigma^2$ is determined by transforming the TDR echo signal using a Fourier transform from the time domain into the frequency domain to calculate the noise floor. The noise floor from the transformed TDR echo signal may be used to calculate the variance $\sigma^2$. In another embodiment, the variance $\sigma^2$ may be estimated by determining the variance of samples within $P_{width}$, i.e. computed as the average squared deviation of each sample amplitude from the mean of all sample amplitudes. Thus, for example for three samples of amplitude 0.1, 0.2 and 0.3, the mean is 0.2 ((0.1+0.2+0.3)/3=0.2) and the variance $\sigma^2$ is:

$$\sigma^2=((0.1-0.2)^2+(0.2-0.2)^2+(0.3-0.2)^2)/3=0.00667$$

AIESD controller 102 estimates the interval Δ based on the value of the variance $\sigma^2$. For signals with small noise severity (i.e. with small variance $\sigma^2$), AIESD controller 102 estimates a small value of Δ. For signals with high noise severity (i.e. with large variance $\sigma^2$), AIESD controller 102 estimates a large value of Δ.

Using the interval Δ calculated by AIESD controller 102, statistical signal processing controller 110 performs a bi-directional search of y(n) within $P_{width}$ 320 as shown in FIG. 4. The number of y(n) values that fall within the interval from $y_{max}$ to $y_{max}-\Delta$ is determined 330. $I_{low}$ is determined as the lowest index of a y(n) value that falls within the interval from $y_{max}$ to $y_{max}-\Delta$. $I_{high}$ is determined as the highest index of a y(n) value that falls within the interval from $y_{max}$ to $y_{max}-\Delta$. As shown in block 250 of FIG. 3, $I_{low}$ and $I_{high}$ are used to calculate the center of the impulse $I_{mid}$. Calculation of $I_{mid}$ may be performed for one impulse in a segment, e.g. the impulse in segment 1 shown in FIG. 4. Once $I_{mid}$ is calculated, it may be used as a reference point to divide impulse train y(n) 305 into $N_{total}$ subgroups with $N_{total}$ equal to the number of segments in the impulse train. As defined above, an impulse train may be divided into a number of complete segments each of period T. Thus in FIG. 4, $N_{total}$ is equal to three. As shown in block 260, starting at $I_{mid}$ as the reference index (index=1), divide each segment in y(n) into $N_T$ samples. Each of the subgroups (corresponding to a segment) now has y(1) to y($N_T$) values. Thus, for the example given in FIG. 4, the first segment may have y($I_{mid}$=1) to y($N_T$) values, the second segment may have y($N_T$+1) to y($2N_T$) values and the third segment may have y($2N_T$+1) to y($3N_T$) values. Each y(n) value with the same index from each segment is added together as shown in block 270. Thus, for the example given in FIG. 4, y(1)=$y^1$(1)+$y^2$(1)+$y^3$(1) with $y^1$(1) first sample in subgroup one, $y^2$(1) first sample in subgroup two, and $y^3$(1) first sample in subgroup three. The value of y(1) is divided by $N_{total}$ as shown in block 270 and described above. Thus, the average values of the samples $\overline{y(n)}$ with the same index in each subgroup are $\overline{y(1)}$=y(1)/3, $\overline{y(2)}$=y(2)/3 ... $\overline{y(N_T)}$=y($N_T$)/3 for our example of $N_{total}$ equal to three segments.

Figure 8:
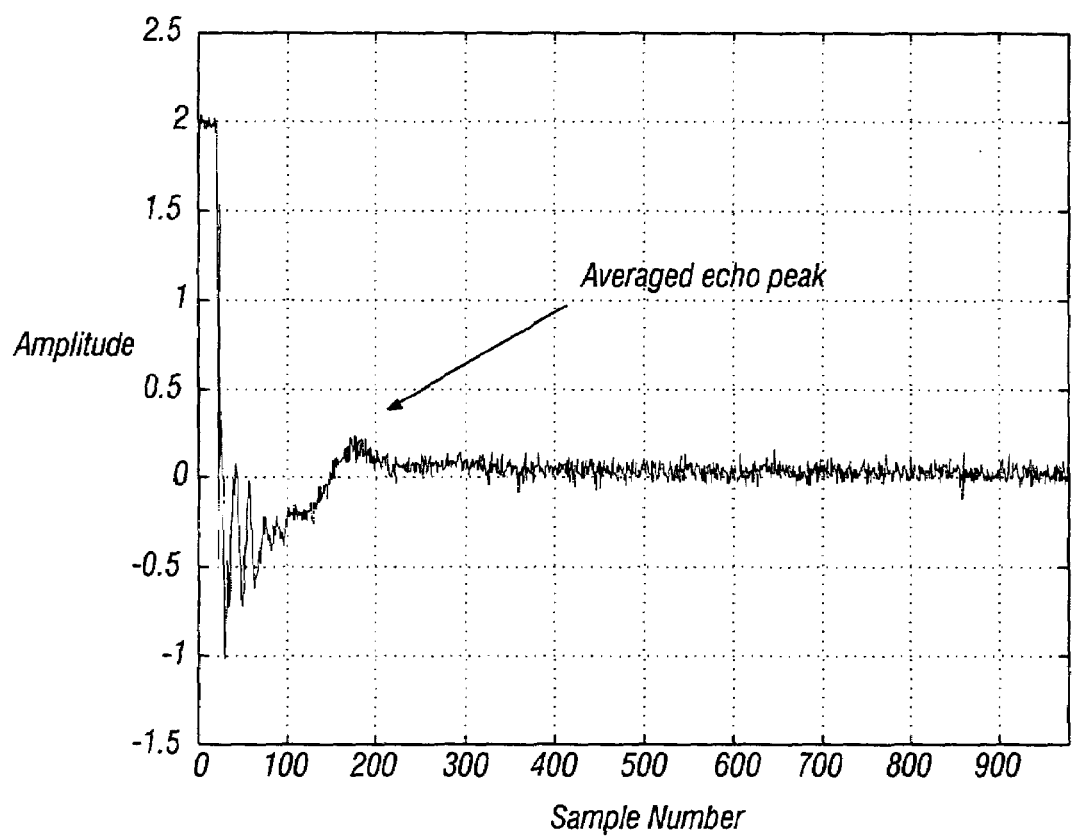
FIG. 8 shows the impulse and TDR echo signals after the time domain echo-averaging technique processes the data shown in FIGS. 6 and 7.

Using the time domain sample-by-sample echo averaging technique on the data shown in FIG. 6 and FIG. 7, the averaged echo peak may be determined as shown in FIG. 8. The average values of the samples $\overline{y(1)}$ ... $\overline{y(N_T)}$ are plotted on a graph of amplitude versus sample number in FIG. 8 to determine the averaged echo peak.

Referring back to FIG. 1, statistical signal processing controller 110 may also process the impulse and TDR echo signals shown in FIGS. 6 and 7 to allow determination of the TDR echo signal using second order statistics for echo enhancement 111. In another embodiment, echo enhancement technique 111 may receive the average values of the samples $\overline{y(n)}$ shown in FIG. 8 from the time domain echo averaging technique 112 and then process this data to allow determination of the TDR echo signal amplitude and time index.

As mentioned previously, statistical signal processing controller 110 receives periodic impulse train y(n) from telephone loop 195. Impulse train y(n) includes the original impulse signal generated by signal generator 105 and the TDR echo signals, both represented as s(n). The noise component present in the impulse train as shown in FIGS. 6 and 7 may be represented as w(n). Thus, the impulse train y(n) may be represented by the following equation:

$$y(n)=s(n)+w(n).$$

The expected value of a signal E[y(n)] is the long-run average value of that signal. Multiplication of the impulse train y(n) with y(n+k), the impulse train shifted an amount k along the x-axis, will generate a superimposed signal that may be larger or smaller in amplitude based on the original amplitude values of y(n). The expected value of E[y(n)y(n+k)] is also known as the second-order statistics $R_s(k)$ of y(n) and defined as:

$$E[y(n)y(n+k)] = E[(s(n)+w(n))(s(n+k)+w(n+k)] \quad \text{Eqn. 1}$$
$$= E[s(n)s(n+k)+w(n)s(n+k)+$$
$$s(n)w(n+k)+w(n)w(n+k)].$$

When k=0, i.e. the impulse train is multiplied by itself without shifting along x-axis, $$E[y(n)y(n+k)]=E[y(n)y(n)]=R_s(0)+\sigma_w^2.$$

In the above equation, $\sigma_w^2$ is the noise variance. When k≠0, $$E[y(n)y(n+k)]=R_s(k).$$

Here $R_s(k)$ is the autocorrelation function of the original impulse signal, TDR echo signals, and noise, the components that makeup y(n). $R_s(k)$ may be considered as a measure of the similarity of the waveform y(n) and the waveform y(n+k). Examining Equation 1, the signal s(n) containing the original impulse signal and TDR signal would have a large similarity to the shifted s(n+k) signal because of its periodic nature. The components of $R_s(k)$ in Equation 1 containing the signal component and noise component w(n) would have a very low measure of similarity as one is a periodic impulse signal and the other is a random noise signal. The last component of $R_s(k)$ in Equation 1 w(n)w(n+k) is random noise and because of its randomness and unpredictability, even a small shift k would eliminate any measure of similarity between these two signals. Thus, the impact of the noise w(n) in Equation 1 is greatly reduced and an accurate TDR echo measurement may be performed using $R_s(k)$ instead of y(n).

Figure 9:
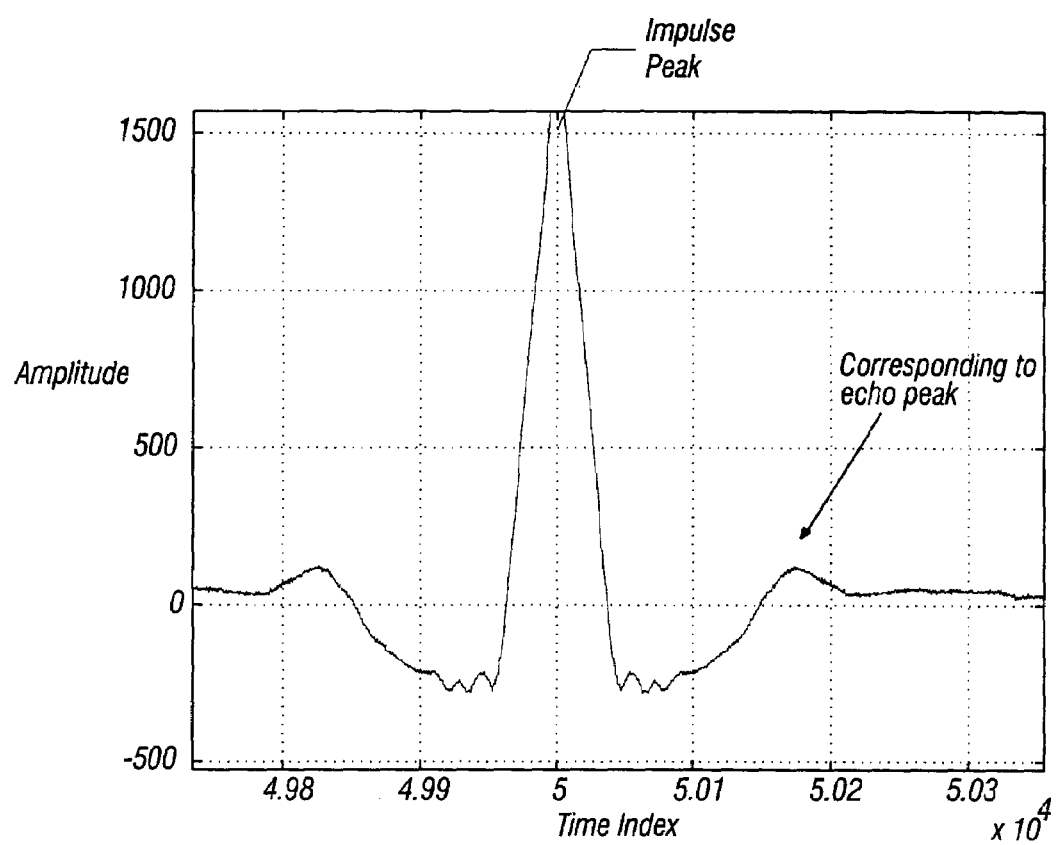
FIG. 9 shows the enhanced impulse and TDR echo signals after the echo enhancement technique processes the data shown in FIGS. 6 and 7.

Referring to FIG. 9, in one embodiment, a graph of amplitude versus time index illustrates use of the echo enhancement technique 111. Echo enhancement technique 111 processes the data shown in FIGS. 6 and 7 to determine the second-order statistics $R_s(k)$ and calculate the echo peak amplitude as shown in FIG. 9. Other loop characteristics such as the loop length, loop taps and insertion loss may also be accurately determined from the graph of the second order statistics $R_s(k)$ based on the relative amplitude and time difference of the impulse peak and echo peak. Thus, the loop length may be determined by multiplying time difference by speed of signal propagation in the telephone loop (i.e. approximately the speed of light 299,792,458 meters/sec multiplied by a constant). Similarly, the loop taps and insertion loss may be determined by examining the change in amplitude of the TDR echo signal from the impulse signal. These loop characteristics may then be used to determine if the telephone line is capable of carrying DSL service.

The echo enhancement technique 111 in one embodiment of the invention may be implemented as software executing on statistical signal processing controller 110. In another embodiment, the echo enhancement technique 111 may be implemented for higher performance using digital and analog circuits.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
  receiving an echo of an impulse signal, wherein the echo includes a plurality of amplitudes;
  dividing the echo amplitudes into a plurality of groups;
  averaging the echo amplitudes across the plurality of groups to determine a time delay between the impulse signal and the echo; and
  controlling a fuzzy impedance mismatch network based on the time delay.

2. The method of claim 1, further comprising providing the time delay to a controller to determine digital subscriber line (DSL) performance.

3. The method of claim 1, further comprising controlling a fuzzy impedance mismatch network based on the time delay.

4. The method of claim 1, further comprising qualifying the telephone loop based at least in part on the time delay.

5. A method, comprising:
  receiving an echo of an impulse signal, wherein the echo includes a plurality of amplitudes;
  dividing the echo amplitudes into a plurality of groups;
  averaging the echo amplitudes across the plurality of groups to determine a time delay between the impulse signal and the echo;
  finding a maximum value and corresponding maximum value index in the echo amplitudes; and
  performing bi-directional searching within an interval starting at the maximum value index to determine the number of echo amplitude values that fall within the interval.

6. The method of claim 5, further comprising:
  calculating an impulse center index, wherein the impulse center index is the average of a lowest index value that falls within the interval and a highest index value tat falls within the interval; and
  wherein the echo amplitudes are divided into groups starting from the impulse center index as a reference index.

7. The method of claim 5, further comprising:
  calculating a loop length, loop taps, and insertion loss of a telephone loop using the time delay between the impulse signal and its echoes; and
  determining using the loop length, loop taps and insertion loss if the telephone loop is capable of carrying DSL service.

8. A method, comprising:
  receiving an echo of an impulse signal, wherein the echo includes a plurality of amplitudes;
  performing a search within an interval starting at a first index to determine a number of echo amplitudes that fall within the interval;
  dividing the echo amplitudes into a plurality of groups starting from a second index; and
  averaging the echo amplitudes across the plurality of groups to determine a time delay between the impulse signal and the echo;
  finding a first value and corresponding first index in the echo amplitudes; and
  calculating the second index, wherein the second index is the average of a lowest index value that falls within the interval and a highest index value that falls within the interval.

9. The method of claim 8, further comprising:
  calculating a loop length, loop taps, and insertion loss of a telephone loop using the time delay between the impulse signal and the echo; and
  determining using the loop length, loop taps and insertion loss if the telephone loop is capable of carrying DSL service.

10. The method of claim 8, further comprising providing the time delay to a controller to determine digital subscriber line (DSL) performance.

11. The method of claim 8, further comprising controlling a fuzzy impedance mismatch network based on the time delay.

12. A method, comprising:
  receiving from a telephone loop an impulse signal, its echo, and noise;
  calculating second order statistics of the impulse signal, the echo, and the noise, wherein the second order statistics reduce the noise; and
  determining time and amplitude differences between the impulse signal and the echo using the second order statistics.

13. The method of claim 12, wherein the second order statistics include the autocorrelation of the echo.

14. The method of claim 13, wherein the time and amplitude differences between the impulse signal and the echo are determined from the autocorrelation.

15. The method of claim 13, further comprising:
  determining loop characteristics of the telephone loop using the time and amplitude differences between the impulse signal and the echo; and
  determining using the loop characteristics if the telephone loop is capable of carrying DSL service.

16. A system, comprising:
  a signal processor to process a return echo of an impulse signal to determine a time delay between the impulse signal and the return echo; and
  a controller coupled to the signal processor; to determine digital subscriber line (DSL) performance over a telephone loop and a fuzzy impedance mismatch network coupled to the controller.

17. The system of claim 16, further comprising:
  a signal generator coupled to the controller, wherein the signal generator to transmit the impulse signal to the telephone loop.

18. The system of claim 17, wherein the return echo is created by the echoes of the impulse signal traveling through the telephone loop.

19. The system of claim 16, wherein the controller to calculate the length of the telephone loop, wherein the length of the telephone loop and other loop characteristics are used to determine if the telephone loop is capable of carrying DSL service.

20. The system of claim 16, wherein the processor includes time domain echo averaging circuitry.

21. The system of claim 16, wherein the processor includes second order statistical echo enhancement circuitry.

22. An article comprising a storage medium storing instructions that when executed by a machine result in:
   receiving an echo of an impulse signal, wherein the echo includes a plurality of amplitudes;
   dividing the echo amplitudes into a plurality of groups;
   averaging the echo amplitudes across the plurality of groups to determine a time delay between the impulse signal and the echo;
   finding a maximum value and corresponding maximum value index in the echo amplitudes; and
   performing bi-directional searching within an interval starting at the maximum value index to determine the number of echo amplitude values that fall within the interval.

23. The article of claim 22, wherein the instructions when executed also result in:
   calculating an impulse center index, wherein the impulse center index is the average of a lowest index value that falls within the interval and a highest index value that falls within the interval; and
   wherein the echo amplitudes are divided into groups starting from the impulse center index as reference index.

24. The article of claim 23, wherein the instructions when executed also result in:
   aligning the echo amplitudes by ascending order of value in each group;
   calculating a loop length, loop taps, and insertion loss of a telephone loop using the time delay between the impulse and its echoes; and
   determining using the loop length, loop taps and insertion loss if the telephone loop is capable of carrying DSL service.

25. A system comprising:
   a signal generator to generate an impulse signal for insertion into a telephone loop;
   a signal processor to determine the amplitude and time index of echoes of the impulse signal;
   a controller coupled to the signal processor to determine digital subscriber line (DSL) performance over the telephone loop; and
   a fuzzy impedance mismatch network coupled to the controller and the sianal generator.

26. The system of claim 25, wherein the signal processor to perform time domain echo averaging.

27. The system of claim 25, wherein the controller to control an impedance value of the fuzzy impedance mismatch network based on the amplitude and time index.

* * * * *

UNITED STATES PATENT AND TRADEMARK OFFICE
CERTIFICATE OF CORRECTION

PATENT NO. : 7,020,246 B2
APPLICATION NO. : 10/609838
DATED : March 28, 2006
INVENTOR(S) : Xiao M. Gao et al.

It is certified that error appears in the above-identified patent and that said Letters Patent is hereby corrected as shown below:

Column 9:
Line 50, "tat" should be --that--.

Column 10:
Line 50, "processor; to determine" should be --processor to determine--.

Column 12:
LIne 19 "sianal" should be --signal--.

Signed and Sealed this

First Day of August, 2006

JON W. DUDAS
*Director of the United States Patent and Trademark Office*